(12) United States Patent
Skurkis et al.

(10) Patent No.: US 10,364,909 B2
(45) Date of Patent: Jul. 30, 2019

(54) FLUID FLOW CONTROL DEVICE AND SYSTEM

(71) Applicants: GM GLOBAL TECHNOLOGY OPERATIONS LLC, Detroit, MI (US); Dynalloy, Inc., Costa Mesa, CA (US)

(72) Inventors: Richard J. Skurkis, Lake Orion, MI (US); Paul W. Alexander, Ypsilanti, MI (US); Anthony L. Smith, Troy, MI (US); James H. Brown, Temecula, CA (US); Tyler P. Ownby, Huntington Beach, CA (US); Xiujie Gao, Troy, MI (US)

(73) Assignees: GM Global Technology Operations LLC, Detroit, MI (US); Dynalloy, Inc., Costa Mesa, CA (US)

( * ) Notice: Subject to any disclaimer, the term of this patent is extended or adjusted under 35 U.S.C. 154(b) by 131 days.

(21) Appl. No.: 15/680,990

(22) Filed: Aug. 18, 2017

(65) Prior Publication Data

US 2019/0056039 A1 Feb. 21, 2019

(51) Int. Cl.
| | |
|---|---|
| *F16K 31/00* | (2006.01) |
| *F16K 31/46* | (2006.01) |
| *F16K 31/02* | (2006.01) |
| *F03G 7/06* | (2006.01) |
| *G05D 23/08* | (2006.01) |
| *F16K 99/00* | (2006.01) |

(52) U.S. Cl.
CPC .......... *F16K 31/002* (2013.01); *F16K 31/025* (2013.01); *F16K 31/465* (2013.01); *F03G 7/065* (2013.01); *F16K 99/0038* (2013.01); *G05D 23/08* (2013.01)

(58) Field of Classification Search
CPC .... F16K 31/002; F16K 31/465; F16K 31/025; F16K 99/0038; G05D 23/08; F03G 7/065
USPC ............... 251/7, 11, 129.06, 294, 331, 335.2
See application file for complete search history.

(56) References Cited

U.S. PATENT DOCUMENTS

| | | | | |
|---|---|---|---|---|
| 3,613,732 | A * | 10/1971 | Willson | F03G 7/065 137/625.44 |
| 3,845,931 | A * | 11/1974 | Pimentel | F03G 7/065 251/11 |
| 4,973,024 | A * | 11/1990 | Homma | F16K 31/002 137/594 |
| 5,061,914 | A * | 10/1991 | Busch | F03G 7/065 337/140 |
| 5,325,880 | A * | 7/1994 | Johnson | F15C 3/04 137/1 |
| 5,619,177 | A * | 4/1997 | Johnson | H01H 59/0009 251/129.01 |

(Continued)

*Primary Examiner* — John Bastianelli
(74) *Attorney, Agent, or Firm* — Quinn IP Law

(57) ABSTRACT

A fluid flow control device includes a resilient substrate translatable between a first flattened position and a second extended position, and an actuator attached to the resilient substrate. The actuator is configured for translating the resilient substrate from the first flattened position to the second extended position. The actuator is formed from a shape memory alloy transitionable between a first state and a second state in response to a change in temperature of the shape memory alloy. A fluid flow control system includes a rotor shield and the fluid flow control device attached to the rotor shield.

16 Claims, 4 Drawing Sheets

(56) References Cited

U.S. PATENT DOCUMENTS

| | | | | |
|---|---|---|---|---|
| 5,865,418 A * | 2/1999 | Nakayama | ............ | F16K 31/002 |
| | | | | 251/11 |
| 6,131,879 A * | 10/2000 | Kluge | ........................ | F15C 3/04 |
| | | | | 137/831 |
| 6,247,678 B1 * | 6/2001 | Hines | .................... | F16K 31/002 |
| | | | | 251/11 |
| 6,729,599 B2 * | 5/2004 | Johnson | .................... | F15C 5/00 |
| | | | | 251/11 |
| 9,057,451 B2 * | 6/2015 | Deperraz | .............. | F16K 31/025 |
| 2002/0171055 A1 * | 11/2002 | Johnson | ................ | F16K 31/002 |
| | | | | 251/11 |
| 2005/0221147 A1 * | 10/2005 | Shioya | .................. | F16K 31/004 |
| | | | | 429/443 |

* cited by examiner

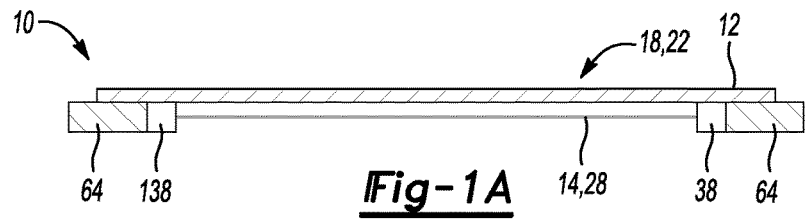
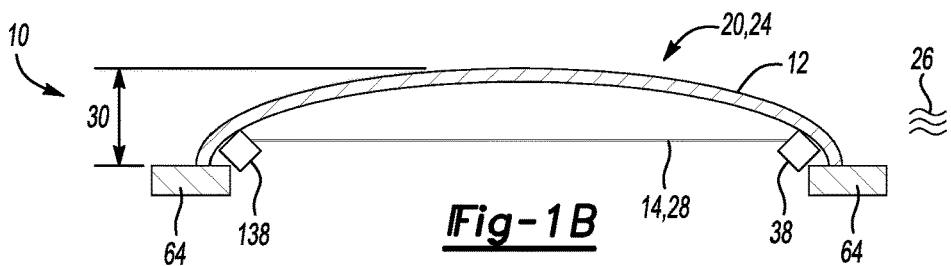
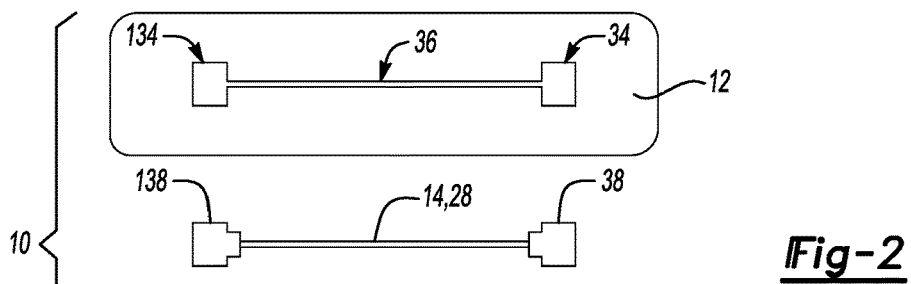
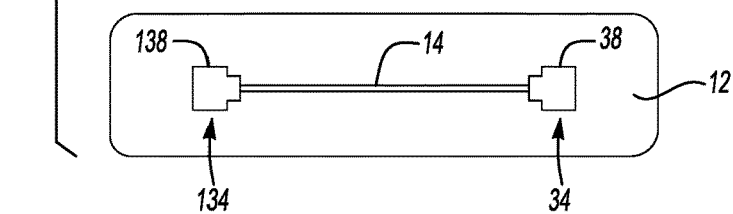
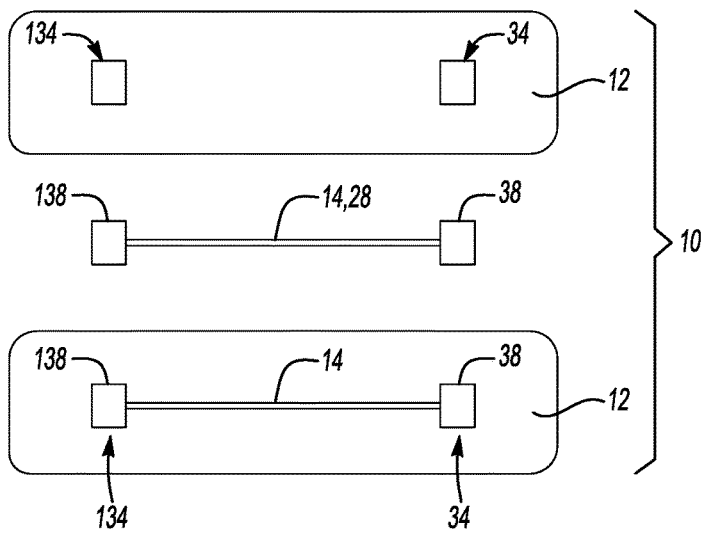

FLUID FLOW CONTROL DEVICE AND SYSTEM

INTRODUCTION

The disclosure relates to a fluid flow control device and system.

Fluid flow control devices, such as valves and seals, are useful for many applications requiring controlled fluid flow. For example, fluid flow control devices may be used to allow or block fluid flow to portions or components of a device. Such fluid distribution often must be precisely and reliably controlled and/or available on an on-demand basis.

SUMMARY

A fluid flow control device includes a resilient substrate and an actuator attached to the resilient substrate. The resilient substrate is translatable between a first flattened position and a second extended position, and the actuator is configured for translating the resilient substrate from the first flattened position to the second extended position. The actuator is formed from a shape memory alloy transitionable between a first state and a second state in response to a change in temperature of the shape memory alloy.

In one aspect, the shape memory alloy may transition between the first state and the second state to translate the resilient substrate from the first flattened position to the second extended position. Further, the resilient substrate may translate from the second extended position to the first flattened position as the shape memory alloy cools and transitions from the second state to the first state. The resilient substrate may have a deflection of less than or equal to 3 mm from the first flattened position when the resilient substrate is disposed in the second extended position.

In another aspect, the resilient substrate may define a first void and a second void spaced apart from the first void. Further, the resilient substrate may define a slit connecting the first void and the second void. The actuator may be configured as a wire that contracts in length in response to the change in temperature and may include a first crimped end and a second crimped end spaced apart from the first crimped end. The first crimped end may be disposed in the first void and the second crimped end may be disposed in the second void such that the wire rests within the slit.

In a further aspect, the resilient substrate may be disposed in a plane and may include a flap articulatable out of the plane. The actuator may be attached to the flap and may articulate the flap out of the plane as the shape memory alloy translates from the first state to the second state. The actuator may also dispose the flap in the plane as the shape memory alloy cools and transitions from the second state to the first state.

In one aspect, the fluid flow control device may further include a housing defining a duct configured to direct fluid flow towards the shape memory alloy. Further, the resilient substrate may be formed from at least one of a plastic and a spring steel.

A fluid flow control system includes a rotor shield defining a cooling channel, a first slot adjacent the cooling channel, a second slot spaced apart from and disposed parallel to the first slot, and a third slot spaced apart from and disposed perpendicular to the first slot and the second slot. The fluid flow control system also includes a fluid flow control device attached to the rotor shield. The fluid flow control device includes a resilient substrate covering the cooling channel and having a first end disposed in the first slot, a second end disposed in the second slot, a central portion disposed between the first end and the second end, and a third portion projecting from the central portion and disposed within the third slot. The resilient substrate is translatable between a first flattened position and a second extended position. The fluid flow control device further includes an actuator attached to the resilient substrate and configured for translating the resilient substrate from the first flattened position to the second extended position. The actuator is formed from a shape memory alloy transitionable between a first state and a second state in response to a change in temperature of the shape memory alloy.

In one aspect, the actuator may be fastened to the resilient substrate between the central portion and the first end and between the central portion and the second end. The fluid flow control system may further include a first fastener attached to the resilient substrate and a second fastener spaced apart from the first fastener and attached to the resilient substrate. The shape memory alloy may be configured as a continuous loop that is attached to the first fastener and the second fastener and contracts in length in response to the change in temperature.

The shape memory alloy may transition from the first state to the second state to translate the resilient substrate from the first flattened position to the second extended position and thereby permit fluid flow through the cooling channel. Further, the resilient substrate may form a conical scoop when the resilient substrate is disposed in the second extended position. The resilient substrate may translate from the second extended position to the first flattened position as the shape memory alloy cools and transitions from the second state to the first state to thereby block fluid flow through the cooling channel.

The above features and advantages and other features and advantages of the present disclosure will be readily apparent from the following detailed description of the preferred embodiments and best modes for carrying out the present disclosure when taken in connection with the accompanying drawings and appended claims.

BRIEF DESCRIPTION OF THE DRAWINGS

FIG. 1A is a schematic illustration of a side view of a fluid flow control device including an actuator attached to a resilient substrate, wherein the resilient substrate is disposed in a first flattened position.

FIG. 1B is a schematic illustration of a side view of the fluid flow control device of FIG. 1A, wherein the resilient substrate is disposed in a second extended position.

FIG. 2 is a schematic illustration of an exploded view of one embodiment of the fluid flow control device of FIGS. 1A and 1B.

FIG. 3 is a schematic illustration of an exploded view of another embodiment of the fluid flow control device of FIGS. 1A and 1B.

DETAILED DESCRIPTION

Figure 4A:
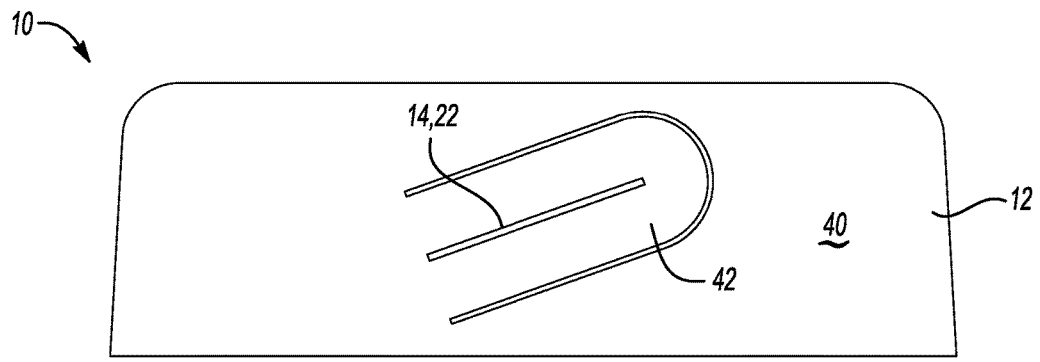
FIG. 4A is a schematic illustration of a top view of a further embodiment of the fluid flow control device of FIGS. 1A and 1B.

Referring to the Figures, wherein like reference numerals refer to like elements, a fluid flow control device 10 including a resilient substrate 12 and an actuator 14 attached to the resilient substrate 12 is shown generally in FIGS. 1A and 1B. A fluid flow control system 16 including the fluid flow control device 10 is also shown generally in FIG. 6. The fluid flow control device 10 and system 16 may be useful for applications which require controlled, precise, reliable, economical, and on-demand fluid distribution to specific portions or areas of an apparatus. The fluid flow control device 10 and system 16 include few components, as set forth in more detail below, and are therefore suitable for applications requiring tight tolerances, small spaces, low weight, or minimalist design. Further, the fluid flow control device 10 and system 16 provide durable sealing, sensing, and actuation, and have excellent reset capabilities and fluid flow control as also set forth in more detail below. As such, the fluid flow control device 10 and system 16 may minimize fluid backflow and fluid waste, may accurately seal off unwanted fluid flow to one or more portions of an apparatus, and may allow precise and controlled fluid flow to a desired portion of the apparatus. For example, the fluid flow control device 10 and system 16 may be characterized as a valve or seal which allows fluid flow solely during select conditions, such as a predetermined temperature excursion.

As such, the fluid flow control device 10 and system 16 may be useful for vehicular applications such as automotive vehicles, construction equipment, and aviation applications. Alternatively, the fluid flow control device 10 and system 16 may be useful for non-vehicular applications such as, but not limited to, electrical generation, electronics cooling, residential pressurized fluid distribution, and recreational and industrial devices. Further, the fluid flow control device 10 and system 16 may be suitable for use with a fluid, such as water or windshield washer fluid comprising a de-icer, bug remover, solvents, and/or detergents. Alternatively, the fluid may be a valve fluid, such as an oil and/or lubricant. As another non-limiting example, the fluid may be a gas, such as nitrogen or air.

Referring now to FIGS. 1A and 1B, the fluid flow control device 10 includes the resilient substrate 12. The resilient substrate 12 is translatable between a first flattened position 18 (FIG. 1A) and a second extended position 20 (FIG. 1B). The fluid flow control device 10 may be disposed in the first flattened position 18 when fluid flow is restricted from passing adjacent to, through, or around the resilient substrate 12. Conversely, the fluid flow control device 10 may be disposed in the second extended position 20 when fluid flow is permitted to pass adjacent to, through, or around the resilient substrate 12.

As used herein, the terminology resilient refers to an ability of the substrate 12 to absorb energy upon elastic deformation and release the energy upon unloading without creating a permanent distortion of the substrate 12. That is, the resilient substrate 12 may be formed from a flexible or elastic material that may spring back into shape after deformation. For example, the resilient substrate 12 may be formed from at least one of a plastic and a spring steel. In another example, the resilient substrate 12 may be formed from aluminum.

Referring again to FIGS. 1A and 1B, the fluid flow control device 10 also includes the actuator 14 attached to the resilient substrate 12. The actuator 14 is configured for translating the resilient substrate 12 from the first flattened position 18 to the second extended position 20. The actuator 14 may also be configured for resetting the resilient substrate 12 from the second extended position 20 to the first flattened position 18.

The actuator 14 is formed from a shape memory alloy transitionable between a first state 22 (FIG. 1A) and a second state 24 (FIG. 1B) in response to a change in temperature (represented generally at symbol 26 in FIG. 1B) of the shape memory alloy. The change in temperature 26 may be effected by, as non-limiting examples, a temperature of the fluid passing in contact with the shape memory alloy; heat, such as from Joule heating or an electric current passed through resistance; or from an external heat source, such as a radiative heating element, a ceramic heating element, and the like. Therefore, as set forth in more detail below, the shape memory alloy may transition between the first state 22 and the second state 24 to translate the resilient substrate 12 between the first flattened position 18 and the second extended position 20.

As used herein, the terminology "shape memory alloy" refers to an alloy that exhibits a shape memory effect and has the capability to quickly change properties in terms of stiffness, spring rate, and/or form stability. That is, the shape memory alloy may undergo a solid state crystallographic phase change via molecular or crystalline rearrangement to shift between a martensite phase, i.e., "martensite", and an austenite phase, i.e., "austenite". That is, the shape memory alloy may undergo a displacive transformation rather than a diffusional transformation to shift between martensite and austenite. A displacive transformation is defined as a structural change that occurs by a coordinated movement of atoms or groups of atoms relative to neighboring atoms or groups of atoms. Further, the martensite phase generally refers to a comparatively lower-temperature phase and is often more deformable than the comparatively higher-temperature austenite phase.

The temperature at which the shape memory alloy begins to change from the austenite phase to the martensite phase is characterized as the martensite start temperature, $M_s$. The temperature at which the shape memory alloy completes the change from the austenite phase to the martensite phase is characterized as the martensite finish temperature, $M_f$, or transformation temperature, $T_{trans}$. Similarly, as the shape memory alloy is heated, the temperature at which the shape memory alloy begins to change from the martensite phase to the austenite phase is characterized as the austenite start temperature, $A_s$. The temperature at which the shape memory alloy completes the change from the martensite phase to the austenite phase is characterized as the austenite finish temperature, $A_f$, or transformation temperature, $T_{trans}$.

The shape memory alloy may have a suitable form, i.e., shape. For example, the shape memory alloy may be configured as a shape-changing element such as a wire 28 (FIGS. 1A and 1B), spring, first resilient member, tape, band, continuous loop 128 (FIG. 7B), and combinations thereof. Further, the shape memory alloy may have a suitable composition. In particular, the shape memory alloy may include in combination an element selected from the group of cobalt, nickel, titanium, indium, manganese, iron, palladium, zinc, copper, silver, gold, cadmium, tin, silicon, platinum, and gallium. For example, suitable shape memory alloys may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations of one or more of each of these combinations. The shape memory alloy can be binary, ternary, or a higher order so long as the shape memory alloy exhibits a shape memory effect, e.g., a change in shape orientation, damping capacity, and the like. Generally, the shape memory alloy may be selected according to desired operating temperatures of the fluid flow control device 10 and system 16. In one specific example, the shape memory alloy may include nickel and titanium.

Therefore, in one non-limiting example illustrated in FIGS. 1A and 1B, the actuator 14, i.e., the shape memory alloy, may be configured as the wire 28. The wire 28 formed from the shape memory alloy may be characterized by the first state 22 (FIG. 1A), i.e., when a temperature of the shape memory alloy is below the martensite finish temperature, $M_f$, or transformation temperature, $T_{trans}$, of the shape memory alloy. Likewise, the wire 28 formed from the shape memory alloy may also be characterized by the second state 24 (FIG. 1B), i.e., when the temperature of the shape memory alloy is above the austenite finish temperature, $A_f$, or transformation temperature, $T_{trans}$, of the shape memory alloy. In addition, although not shown, the fluid flow control device 10 and system 16 may include a plurality of shape memory alloys and/or a plurality of wires 28. Further, each of the plurality of actuators 14 may contact the fluid. That is, each of the plurality of actuators 14 may be disposed in and/or surrounded by the fluid.

Therefore, for embodiments in which the actuator 14 is configured as the wire 28, the wire 28 may contract in length in response to the change in temperature 26 (FIG. 1B) to translate the resilient substrate 12 from the first flattened position 18 (FIG. 1A) to the second extended position 20 (FIG. 1B), and thereby extend or bow the resilient substrate 12 away from a sealing face 64 of the apparatus. That is, the shape memory alloy may transition between the first state 22 and the second state 24 to translate the resilient substrate 12 from the first flattened position 18 to the second extended position 20. Conversely, the resilient substrate 12 may translate from the second extended position 20 to the first flattened position 18 as the shape memory alloy cools and transitions from the second state 24 to the first state 22.

In other words, as the shape memory alloy warms, the shape memory alloy may contract in length and pull on the resilient substrate 12 to thereby bow or extend the resilient substrate 12. Conversely, as the shape memory alloy cools, the shape memory alloy may expand in length such that the resilient substrate 12 relaxes and returns to the first flattened position 18 so that the fluid flow control device 10 resets. Referring to FIG. 1B, the resilient substrate 12 may have a deflection 30 of less than or equal to 3 mm, e.g., less than or equal to 2 mm, from the first flattened position 18 when the resilient substrate 12 is disposed in the second extended position 20. Therefore, the fluid flow control device 10 may be suitable for applications requiring small, lightweight components as opposed to complicated or heavy valves and seals.

Figure 7A:
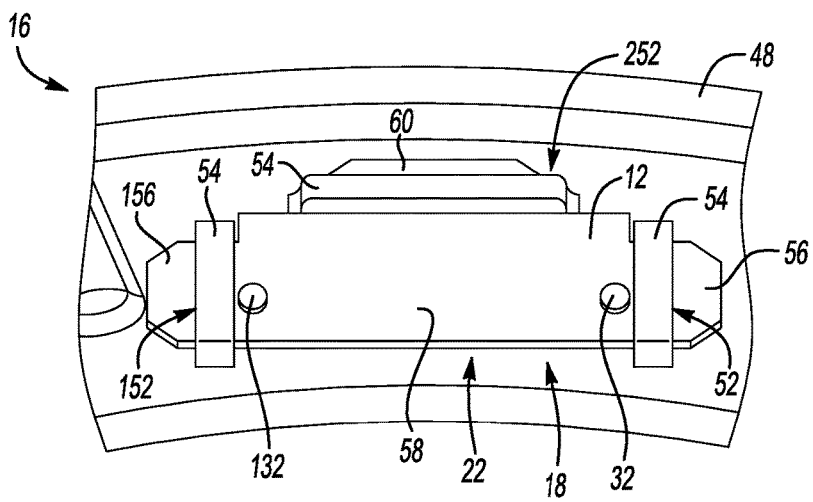
FIG. 7A is a schematic illustration of a perspective view of a top of the fluid flow control device of FIG. 6, wherein the resilient substrate is disposed in a first flattened position.

Referring again to FIG. 1A, the actuator 14 may be fixedly attached to the resilient substrate 12 in a suitable manner to ensure that the actuator 14 effectively pulls on and extends the resilient substrate 12 upon exposure to a warming temperature. In one example, as shown in FIGS. 7A and 7C, the fluid flow control device 10 may include a first fastener 32 attached to the resilient substrate 12 and a second fastener 132 spaced apart from the first fastener 32 and attached to the resilient substrate 12. In one non-limiting example, the first fastener 32 and the second fastener 132 may be a rivet.

Alternatively, as described with reference to FIGS. 2 and 3, the resilient substrate 12 may define a first void 34 and a second void 134 spaced apart from the first void 34. Further, as shown in FIG. 2, the resilient substrate 12 may define a slit 36 connecting the first void 34 and the second void 134. For this embodiment, the actuator 14 may be configured as the wire 28 that contracts in length in response to the change in temperature 26 (FIG. 1B) and includes a first crimped end 38 and a second crimped end 138 spaced apart from the first crimped end 38. The first crimped end 38 may be disposed in the first void 34 and the second crimped end 138 may be disposed in the second void 134 such that the wire 28 rests in the slit 36. Such a configuration may be suitable for robot-assisted manufacturing of the fluid control device 10 since the actuator 14 may be automatically positioned or dropped into the slit 36 without bending, deflecting, or bowing the resilient substrate 12. However, the embodiment illustrated in FIG. 3 in which the resilient substrate 12 does not define the slit 36 may be suitable for manual assembly of the fluid control device 10. For this embodiment, the resilient substrate 12 may be bent or deflected or bowed while each end 38, 138 is situated into a respective void 34, 134.

Figure 4B:
FIG. 4B is a schematic illustration of a side view of the fluid flow control device of FIG. 4A, wherein the resilient substrate is disposed in the first flattened position.
Figure 4C:
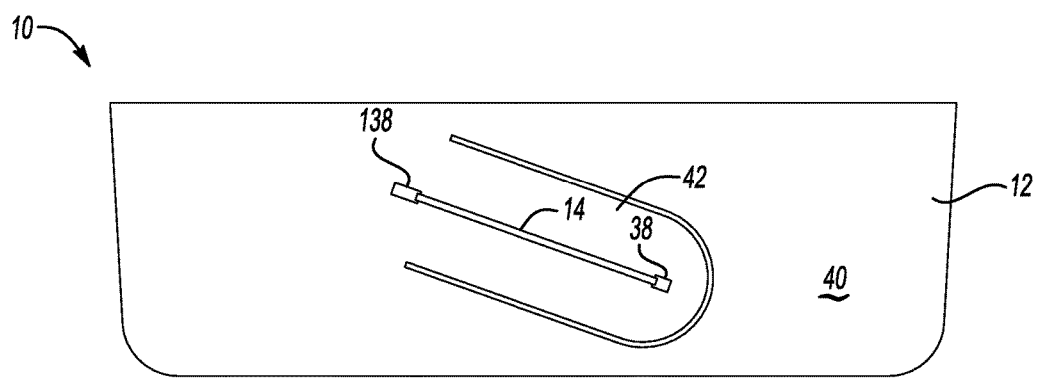
FIG. 4C is a schematic illustration of a bottom view of the fluid flow control device of FIG. 4A.
Figure 4D:
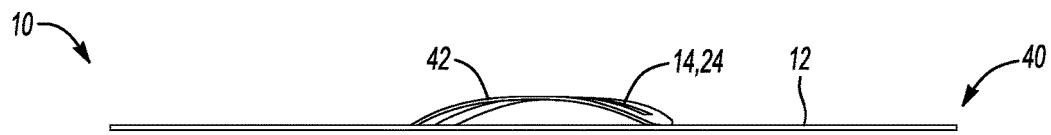
FIG. 4D is a schematic illustration of a side view of the fluid flow control device of FIG. 4A, wherein the resilient substrate is disposed in the second extended position.

Referring now to FIGS. 4A-4D, in another embodiment, the resilient substrate 12 may be disposed in a plane 40 and may include a flap 42 articulatable out of the plane 40. As best shown in FIGS. 4C and 4D, the actuator 14 may be attached to the flap 42 and may articulate the flap 42 out of the plane 40 (FIG. 4D) as the shape memory alloy transitions from the first state 22 (FIG. 4A) to the second state 24 (FIG. 4D). That is, as the shape memory alloy warms, the shape memory alloy may contract in length, pull on the flap 42, and articulate the flap 42 out of the plane 40. Conversely, the actuator 14 may be attached to the flap 42 and may dispose the flap 42 in the plane 40 (as best shown in FIG. 4B) as the shape memory alloy cools and transitions from the second state 24 to the first state 22. That is, the actuator 14 may reset the flap 42 into the plane 40 as the shape memory alloy cools.

Figure 5:
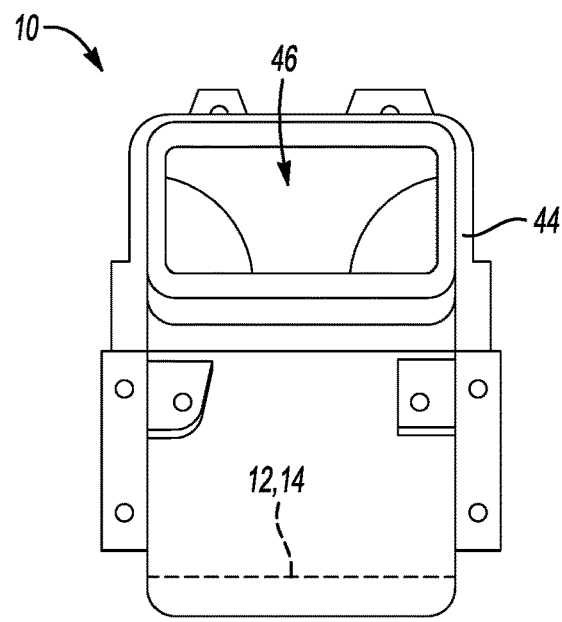
FIG. 5 is a schematic illustration of a perspective view of an additional embodiment of the fluid flow control device of FIGS. 1A and 1B.

Further, as described with reference to FIG. 5, the fluid flow control device 10 may further include a housing 44 defining a duct 46 configured to direct fluid flow, e.g., airflow, towards the shape memory alloy. The housing 44 may be formed from a material suitable for channeling fluid through the duct 46, such as a plastic or metal. For example, the fluid flow control device 10 may be a battery charger for a cellular communications device (not shown) for a vehicle. As a battery of the cellular communications device charges and emits heat, the shape memory alloy may contract and articulate the flap 42 out of plane 40 (FIG. 4D) to allow a cooling airflow through the duct 46 to the battery. Conversely, the flap 42 may be disposed in the plane 40 (FIG. 4B) to block airflow through the duct 46 to the battery. In another non-limiting example, the fluid flow control device 10 may be a brake duct for a vehicle and the actuator 14 and flap 42 may enable a cooling of brake components.

Figure 6:
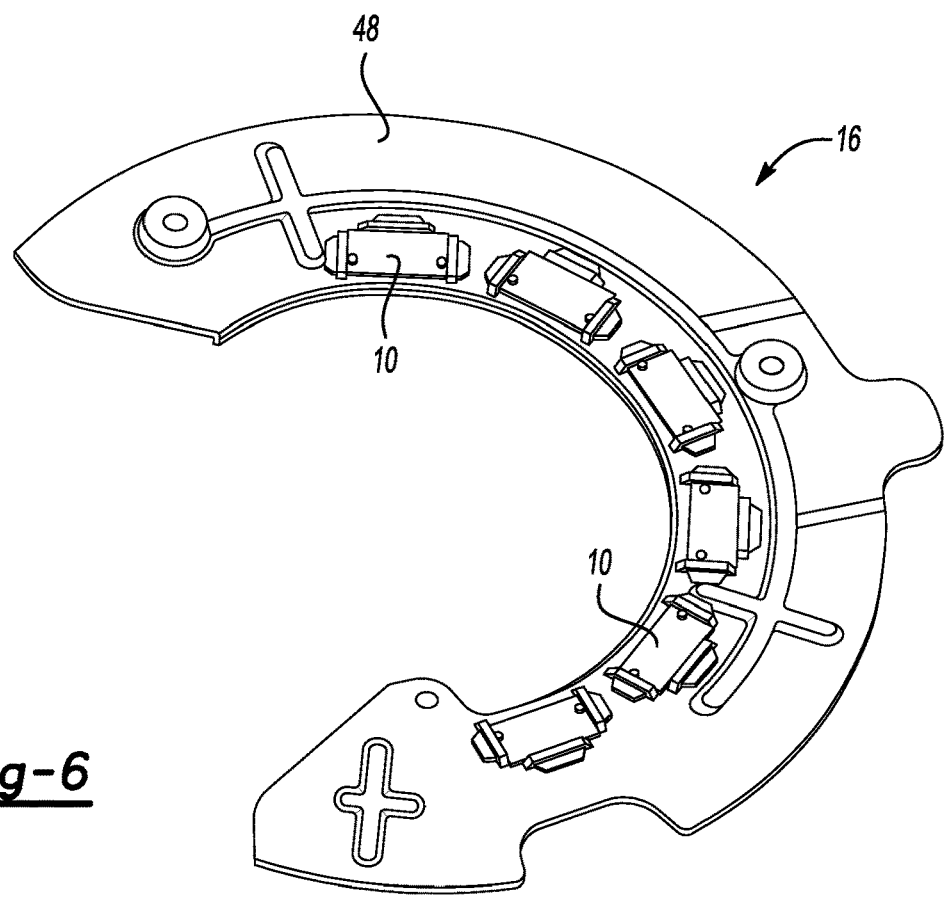
FIG. 6 is a schematic illustration of a perspective view of a fluid flow control system including a rotor shield and an additional embodiment of the fluid flow control device of FIGS. 1A and 1B attached to the rotor shield and including a resilient substrate.

Referring now to FIG. 6, a fluid flow control system 16 includes a rotor shield 48 and the fluid flow control device 10 attached to the rotor shield 48. Although not shown, the rotor shield 48 may be a component of a disc brake assembly of a vehicle. For example, the disc brake assembly may include a caliper configured for squeezing a plurality of brake pads against a disc or rotor to provide braking for the vehicle. The rotor shield 48 may be configured for covering and protecting the rotor.

Referring now to FIG. 7C, the rotor shield 48 defines a cooling channel 50, a first slot 52 adjacent the cooling channel 50, a second slot 152 spaced apart from and disposed parallel to the first slot 52, and a third slot 252 spaced apart from and disposed perpendicular to the first slot 52 and the second slot 152. For example, the first slot 52, second slot 152, and third slot 252 may be defined by three respective bridges or clamps 54 (FIGS. 7A and 7C) arranged in a generally triangular configuration around the cooling channel 50. Generally, regardless of shape, the cooling channel 50 may be configured to cool one or more components of the disc brake assembly (not shown).

Referring again to FIG. 7A, the fluid flow control device 10 is attached to the rotor shield 48 and includes the resilient substrate 12 covering the cooling channel 50 and having a first end 56 disposed in the first slot 52; a second end 156 disposed in the second slot 152; a central portion 58 disposed between the first end 56 and the second end 156; and a third portion 60 projecting from the central portion 58 and disposed within the third slot 252. That is, the fluid flow control device 10 may be clamped to the rotor shield 48.

Further, as described with reference to FIGS. 7A and 7C, the resilient substrate 12 may be translatable between the first flattened position 18 (FIG. 7A) and the second extended position 20 (FIG. 7C). More specifically, the fluid flow control device 10 also includes the actuator 14 attached to the resilient substrate 12 and configured for translating the resilient substrate 12 from the first flattened position 18 to the second extended position 20. The actuator 14 is formed from the shape memory alloy transitionable between the first state 22 (FIG. 7A) and the second state 24 (FIG. 7C) in response to the change in temperature 26 (FIG. 7C) of the shape memory alloy.

Figure 7B:
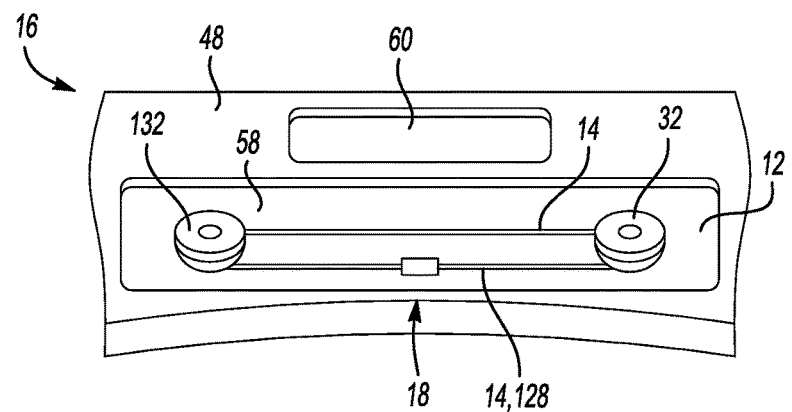
FIG. 7B is a schematic illustration of a perspective view of a bottom of the fluid flow control device of FIG. 6.
Figure 7C:
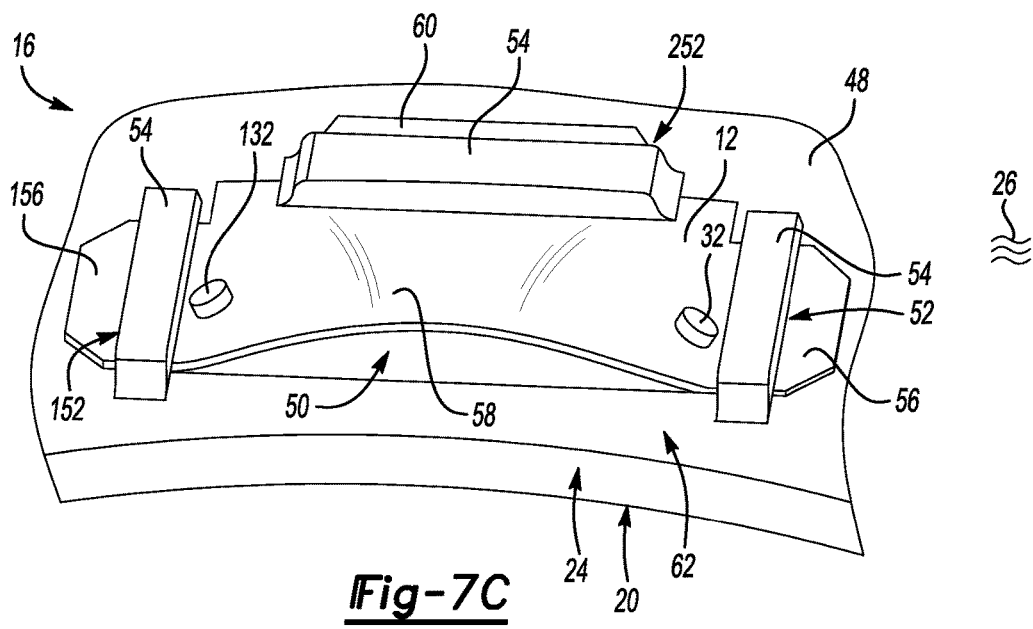
FIG. 7C is a schematic illustration of a perspective view of a top of the fluid flow control device of FIG. 6, wherein the resilient substrate is disposed in a second extended position.

Referring now to FIG. 7B, the actuator 14 may be fastened to the resilient substrate 12 between the central portion 58 and the first end 56 and between the central portion 58 and the second end 156. That is, the first fastener 32 may be attached to the resilient substrate 12 between the first end 56 and the central portion 58, and the second fastener 132 may be attached to the resilient substrate 12 between the second end 156 and the central portion 58. For this example, the shape memory alloy may be configured as the continuous loop 128 that is attached to the first fastener 32 and the second fastener 132 and may contract in length in response to the change in temperature 26. That is, the continuous loop 128 may shorten when the shape memory alloy is warmed.

As such, the actuator 14 may pull on the resilient substrate 12 and cause the resilient substrate 12 to bow away from the rotor shield 48. As best shown in FIG. 7C, the resilient substrate 12 may form a conical scoop 62 when the resilient substrate 12 is disposed in the second extended position 20. In particular, the shape memory alloy may transition from the first state 22 (FIG. 7A) to the second state 24 (FIG. 7C) to translate the resilient substrate 12 from the first flattened position 18 to the second extended position 20 and thereby permit fluid flow through the cooling channel 50. That is, the fluid flow control device 10 may allow fluid flow past the conical scoop 62 to the cooling channel 50 to thereby cool one or more components of the disc brake assembly.

Conversely, the resilient substrate 12 may translate from the second extended position 20 (FIG. 7C) to the first flattened position 18 (FIG. 7A) as the shape memory alloy cools and transitions from the second state 24 to the first state 22 to thereby block fluid flow through the cooling channel 50. That is, the continuous loop 128 may lengthen or extend when the shape memory alloy is cooled. The actuator 14 may thus relax and cause the resilient substrate 12 to again flatten against the rotor shield 48, as best shown in FIG. 7B. Therefore, the shape memory alloy may transition from the second state 24 to the first state 22 to translate the resilient substrate 12 from the second extended position 20 to the first flattened position 18 and thereby block fluid flow through the cooling channel 50.

As such, the fluid flow control device 10 and system 16 may be useful for applications which require controlled, precise, reliable, economical, and on-demand fluid distribution to specific portions or areas of the apparatus. The fluid flow control device 10 and system 16 are suitable for applications requiring tight tolerances, small spaces, low weight, or minimalist design. Therefore, the fluid flow control device 10 and system 16 may provide an economical and compact alternative to multi-component, complex valve and seal systems.

While the best modes for carrying out the disclosure have been described in detail, those familiar with the art to which this disclosure relates will recognize various alternative designs and embodiments for practicing the disclosure within the scope of the appended claims.

What is claimed is:

1. A fluid flow control device comprising:
   a resilient substrate translatable between a first flattened position and a second extended position; and
   an actuator attached to the resilient substrate and configured for translating the resilient substrate from the first flattened position to the second extended position;
   wherein the actuator is formed from a shape memory alloy transitionable between a first state and a second state in response to a change in temperature of the shape memory alloy;
   wherein the resilient substrate defines a first void, a second void spaced apart from the first void, and a slit connecting the first void and the second void;
   wherein the actuator is configured as a wire that contracts in length in response to the change in temperature and includes a first crimped end and a second crimped end spaced apart from the first crimped end;
   wherein the first crimped end is disposed in the first void and the second crimped end is disposed in the second void such that the wire rests within the slit.

2. The fluid flow control device of claim 1, wherein the shape memory alloy transitions between the first state and the second state to translate the resilient substrate from the first flattened position to the second extended position.

3. The fluid flow control device of claim 1, wherein the resilient substrate translates from the second extended position to the first flattened position as the shape memory alloy cools and transitions from the second state to the first state.

4. The fluid flow control device of claim 1, wherein the resilient substrate has a deflection of less than or equal to 3 mm from the first flattened position when the resilient substrate is disposed in the second extended position.

5. The fluid flow control device of claim 1, wherein the resilient substrate is disposed in a plane and includes a flap articulatable out of the plane.

6. The fluid flow control device of claim 5, wherein the actuator is attached to the flap and articulates the flap out of the plane as the shape memory alloy transitions from the first state to the second state.

7. The fluid flow control device of claim 5, wherein the actuator is attached to the flap and disposes the flap in the plane as the shape memory alloy cools and transitions from the second state to the first state.

8. The fluid flow control device of claim 1, further including a housing defining a duct configured to direct fluid flow towards the shape memory alloy.

9. The fluid flow control device of claim 1, wherein the resilient substrate is formed from at least one of a plastic and a spring steel.

10. A fluid flow control system comprising:
a rotor shield defining:
a cooling channel;
a first slot adjacent the cooling channel;
a second slot spaced apart from and disposed parallel to the first slot; and
a third slot spaced apart from and disposed perpendicular to the first slot and the second slot; and
a fluid flow control device attached to the rotor shield and including:
a resilient substrate covering the cooling channel and having:
a first end disposed in the first slot;
a second end disposed in the second slot;
a central portion disposed between the first end and the second end; and
a third portion projecting from the central portion and disposed within the third slot;
wherein the resilient substrate is translatable between a first flattened position and a second extended position; and
an actuator attached to the resilient substrate and configured for translating the resilient substrate from the first flattened position to the second extended position, wherein the actuator is formed from a shape memory alloy transitionable between a first state and a second state in response to a change in temperature of the shape memory alloy.

11. The fluid flow control system of claim 10, wherein the actuator is fastened to the resilient substrate between the central portion and the first end and between the central portion and the second end.

12. The fluid flow control system of claim 11, further including a first fastener attached to the resilient substrate and a second fastener spaced apart from the first fastener and attached to the resilient substrate.

13. The fluid flow control system of claim 12, wherein the shape memory alloy is configured as a continuous loop that is attached to the first fastener and the second fastener and contracts in length in response to the change in temperature.

14. The fluid flow control system of claim 10, wherein the shape memory alloy transitions from the first state to the second state to translate the resilient substrate from the first flattened position to the second extended position and thereby permit fluid flow through the cooling channel.

15. The fluid flow control system of claim 14, wherein the resilient substrate forms a conical scoop when the resilient substrate is disposed in the second extended position.

16. The fluid flow control system of claim 14, wherein the resilient substrate translates from the second extended position to the first flattened position as the shape memory alloy cools and transitions from the second state to the first state to thereby block fluid flow through the cooling channel.

* * * * *